US009137520B2

(12) United States Patent
Lim et al.

(10) Patent No.: US 9,137,520 B2
(45) Date of Patent: Sep. 15, 2015

(54) STEREOSCOPIC IMAGE DISPLAY DEVICE AND METHOD OF DISPLAYING STEREOSCOPIC IMAGE

(75) Inventors: Kyoung Ho Lim, Yongin-si (KR); Joo-Young Kim, Suwon-si (KR); Cheol-Woo Park, Suwon-si (KR); Jung-Taek Kim, Daejeon (KR); Kyoung Won Lee, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 495 days.

(21) Appl. No.: 13/363,833

(22) Filed: Feb. 1, 2012

(65) Prior Publication Data
US 2013/0063419 A1 Mar. 14, 2013

(30) Foreign Application Priority Data

Sep. 8, 2011 (KR) ........................ 10-2011-0091209

(51) Int. Cl.
*H04N 13/02* (2006.01)
*G06T 15/40* (2011.01)
*G09G 3/00* (2006.01)

(52) U.S. Cl.
CPC ............ *H04N 13/026* (2013.01); *G06T 15/405* (2013.01); *G09G 3/003* (2013.01)

(58) Field of Classification Search
CPC .......... H04N 13/0497; H04N 13/0404; H04N 13/0409; H04N 13/0422; G02B 27/2214
See application file for complete search history.

(56) References Cited

U.S. PATENT DOCUMENTS

| 2002/0101440 | A1* | 8/2002 | Niikawa et al. ............... 345/698 |
| 2004/0257623 | A1* | 12/2004 | Suzuki ........................ 358/3.03 |
| 2009/0213240 | A1 | 8/2009 | Sim et al. |
| 2010/0007661 | A1 | 1/2010 | Kim et al. |
| 2011/0025830 | A1 | 2/2011 | McNamer et al. |
| 2011/0074778 | A1 | 3/2011 | Turner et al. |
| 2011/0074924 | A1 | 3/2011 | Barenbrug et al. |
| 2011/0109620 | A1 | 5/2011 | Hong et al. |
| 2011/0126160 | A1* | 5/2011 | Han et al. ...................... 715/848 |
| 2011/0158530 | A1* | 6/2011 | Okihara et al. ................ 382/173 |
| 2011/0316963 | A1* | 12/2011 | Li et al. ........................ 348/14.1 |
| 2012/0026289 | A1* | 2/2012 | Suenaga et al. ................. 348/44 |

FOREIGN PATENT DOCUMENTS

| JP | 2011-082631 | 4/2011 |
| KR | 10-0656783 | 12/2006 |

(Continued)

OTHER PUBLICATIONS

English Abstract for Publication No. 10-0656783.
English Abstract for Publication No. 10-2009-0035191.
English Abstract for Publication No. 10-2011-0030107.

(Continued)

*Primary Examiner* — Dave Czekaj
*Assistant Examiner* — Nam Pham
(74) *Attorney, Agent, or Firm* — F. Chau & Associates, LLC

(57) ABSTRACT

A stereoscopic image display device includes an image dividing module dividing an input image including a two dimensional (2D) image and a depth information image into a plurality of divisions, wherein each of the divisions includes a portion of the 2d image and a portion of the depth information image corresponding to the portion of the 2D image, an image rendering module rendering the divisions to output a plurality of rendered images, and a display panel assembly combining the plurality of rendered images.

20 Claims, 9 Drawing Sheets

(56) References Cited

FOREIGN PATENT DOCUMENTS

| KR | 10-2009-0035191 | 4/2009 |
| KR | 10-2011-0025796 | 3/2011 |
| KR | 10-2011-0030107 | 3/2011 |
| KR | 10-2011-0032351 | 3/2011 |
| KR | 10-2011-0046127 | 5/2011 |

OTHER PUBLICATIONS

English Abstract for Publication No. 10-2011-0032351.
English Abstract for Publication No. 2011-082631.
English Abstract for Publication No. 10-2011-0046127.
English Abstract for Publication No. WO/2009/147581 (FOR 10-2011-0025796).

* cited by examiner

STEREOSCOPIC IMAGE DISPLAY DEVICE AND METHOD OF DISPLAYING STEREOSCOPIC IMAGE

CROSS-REFERENCE TO RELATED APPLICATION

This application claims the benefit under 35 USC 119 of Korean Patent Application No. 10-2011-0091209 filed in the Korean Intellectual Property Office on Sep. 8, 2011, the entire contents of which are herein incorporated by reference in their entirety.

BACKGROUND (a) Technical Field

The present disclosure relates to a stereoscopic image display device and a method of displaying a stereoscopic image.

(b) Description of Related Art

In general, three dimensional (3D) image display technology creates a stereoscopic effect using the concept of binocular parallax or binocular disparity. Binocular parallax uses a difference in an object's location as seen from two different points (e.g., two different lens or a viewer's eyes) to create the stereoscopic effect. The binocular parallax is an important factor for achieving the stereoscopic effect at a short distance.

More particularly, different 2D images may be viewed by a left eye (hereafter referred to as "left eye image") and a right eye (hereafter referred to as "right eye image"), and when the different 2D images are combined, e.g., by a viewer's the brain, the left eye image and the right eye image are composed into a stereoscopic image having perceptible depth.

A stereoscopic image display using binocular parallax may classified into a stereoscopic type or an autostereoscopic type. Stereoscopic type displays make use of shutter glasses or polarized glasses to control the viewing of the left eye image and right eye image. Autostereoscopic type displays typically include a lenticular lens or a parallax barrier arranged in the device.

In the autostereoscopic type, the 2D image and an image having depth information are simultaneously rendered and the lenticular lens or the parallax barrier is used to create a differential perception of the left eye and right eye to thereby create the stereoscopic effect. The stereoscopic image display device of the autostereoscopic type may display the stereoscopic image having a plurality of views for observers positioned at several angles, and as a result, as the number of views is increased, the resolution of the stereoscopic image is decreased. For displaying a stereoscopic image of high resolution, the resolution of an original image needs to be high.

SUMMARY

A stereoscopic image display device according to an exemplary embodiment of the present disclosure includes an image dividing module dividing an input image including a 2D image and a depth information image into a plurality of divisions, wherein each of the divisions includes a portion of the 2D image and a portion of the depth information image corresponding to the portion of the 2D image, an image rendering module rendering the divisions to output a plurality of rendered images, and a display panel assembly combining the plurality of rendered images.

The plurality of divisions may include a first division and a second division, and a right side region of the first division may overlap a left side of the second division, and image data of the right side region of the first division may be substantially the same as image data of the left side region of the second division.

A width of the left side region may be substantially the same as a width of the right side region.

The stereoscopic image display device may further include an image scaling module expanding the input image to output an extended image, wherein the image dividing module divides the extended image into the plurality of divisions.

The extended image may be extended in a horizontal direction as compared to the input image.

The display panel assembly may output a plurality of combined images corresponding to a plurality of views, the plurality of combined images may include a first combined image corresponding to a first view and a second combined image corresponding to a second view, and wherein image data of the second combined image may be shifted from a position of corresponding image data of the first combined image.

A shift distance x of the second combined image may be determined as:

$$x=(h*D)/(H-h)$$

wherein h is a height of an object displayed by the display panel assembly, H is a distance between the second view and the display panel assembly, and D is a distance between the first view and the second view.

A width of the left side region and a width of the right side region may be equal to or greater than two times the shift distance x when h is a maximum value.

The input image may include a header, and the header may be respectively inserted to the divisions.

The input image may include a header, and the header is transmitted to the image rendering module.

A method of displaying a stereoscopic image according to an exemplary embodiment of the present disclosure includes dividing an input image including a 2D image and a depth information image into a plurality of divisions, rendering the divisions to output respective rendered images, and outputting a combined image in which the rendered images are combined, wherein each of the divisions includes a portion of the 2D image and a portion of the depth information image corresponding to the portion of the 2D image.

The method may further include extending the input image to output an extended image, and the extended image may be divided into the plurality of divisions.

The outputting of the combined image may include outputting a plurality of combined images corresponding to a plurality of views, the plurality of combined images may include a first combined image corresponding to a first view and a second combined image corresponding to a second view, and wherein image data the second combined image may be shifted from a position of corresponding image data of the first combined image.

A stereoscopic image display device according to an exemplary embodiment of the present disclosure includes an image rendering module receiving a plurality of divisions of an input image, each of the divisions including a portion of a two dimensional (2D) image of the input image and a portion of the depth information image of the input image corresponding to the portion of the 2D image, and the image rendering module rendering the divisions to output a plurality of rendered images, and a display panel assembly combining the plurality of rendered images into a stereoscopic image.

The stereoscopic image display device may further include an image dividing module dividing the input image into the plurality of divisions for independent transmission to the image rendering module.

The stereoscopic image display device may further include an image scaling module expanding the input image to output an extended image, wherein the image dividing module divides the extended image into the plurality of divisions.

DETAILED DESCRIPTION OF EXEMPLARY EMBODIMENTS

Figure 1:
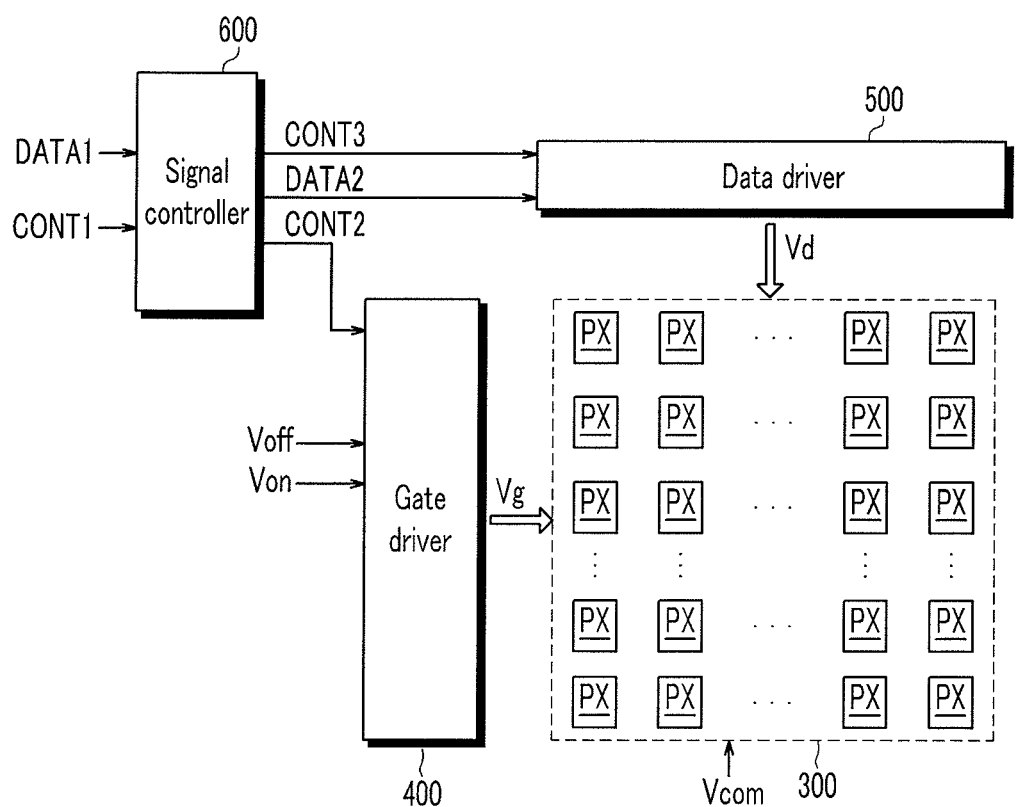
FIG. 1 is a view of a stereoscopic image display device according to an exemplary embodiment of the present disclosure.

Exemplary embodiments of the present disclosure will be described more fully hereinafter with reference to the accompanying drawings. As those skilled in the art would realize, exemplary embodiments described herein may be modified without departing from the spirit or scope of the present disclosure. In the drawings, some portions may omitted to clearly describe exemplary embodiments of the present disclosure. Furthermore, detailed descriptions of well-known art may not be given.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

FIG. 1 is a view of a stereoscopic image display device according to an exemplary embodiment of the present disclosure.

Referring to FIG. 1, a stereoscopic image display device according to an exemplary embodiment of the present disclosure includes a display panel assembly 300, a gate driver 400, a data driver 500, and a signal controller 600.

The display panel assembly 300 includes a plurality of signal lines (not shown) and a plurality of pixels PX connected thereto and arranged in an approximate matrix format. The display panel assembly 300 may include a display panel, such as a liquid crystal display panel, an organic light emitting panel, a plasma display panel, an electrophoresis display panel, etc. The display panel assembly 300 may include a light source.

The signal lines include a plurality of gate lines transmitting a gate signal (also referred to as a scanning signal) and a plurality of data lines transmitting a data voltage. The gate lines are arranged substantially parallel to one another and extend approximately in a row direction, and the data lines are arranged substantially parallel to one another and extend approximately in a column direction.

The plurality of pixels PX of the display panel assembly 300 may each uniquely display a primary color (i.e., spatial division) or sequentially display the primary colors in turn (i.e., temporal division), such that a spatial or temporal combination of the primary colors may be perceived as a desired color. An example of a set of the primary colors includes red, green, and blue colors.

The gate driver 400 is connected to a gate line of the display panel assembly 300 and applies the gate signal Vg to the gate line. The gate signal Vg comprises a gate-on voltage Von and a gate-off voltage Voff for controlling a switching element connected to the gate line.

The data driver 500 is connected to the data line of the display panel assembly 300 and applies the data voltage to the data line.

The signal controller 600 controls the operation of the gate driver 400 and the data driver 500.

At least one of the gate driver 400, the data driver 500, and the signal controller 600 may be mounted on a display device as a type of integrated circuit (IC) chip, and may be integrated with the display panel.

The signal controller 600 receives an input image signal DATA1 and an input control signal CONT1 from an external graphics controller (not shown). For example, the input control signal CONT1 may include a vertical synchronizing signal, a horizontal synchronizing signal, a main clock signal, and a data enable signal. The signal controller 600 processes the input image signal DATA1 to generated processed image signals DATA2 suitable for the operating conditions of the display panel assembly 300. Further, based on the input image signal DATA1 and the input control signal CONT1, the signal controller 600 generates a gate control signal CONT2 and a data control signal CONT3. The signal controller 600 outputs the gate control signal CONT2 to the gate driver 400, and outputs the data control signal CONT3 and the processed image signals DATA2 to the data driver 500.

The gate control signal CONT2 may include a scanning start signal informing a start of the frame, a gate clock signal controlling output timing of the gate-on voltage Von, and an output enable signal restricting a duration of the gate-on voltage Von.

The data control signal CONT3 may include a horizontal synchronization start signal informing a transmission start of the image signal DATA2, a load signal applying the data voltage to the data line, an inversion signal RVS inverting the polarity of the data voltage with respect to the common voltage Vcom, and a data clock signal. The polarity of the data voltage with respect to the common voltage Vcom may also be referred to as a polarity of the data voltage.

The data driver 500 converts the processed image signal DATA2 into the data voltage according to the data control signal CONT3 from the signal controller 600 and applies the data voltage Vd to the data line.

The gate driver 400 applies the gate-on voltage Von to the gate line according to the gate control signal CONT2 from the signal controller 600 to turn on the switching element connected to the gate line, and thereby the data voltage Vd applied to the data line is applied to the corresponding pixel though the turned-on switching element.

A difference between the data voltage Vd applied to the pixel and the common voltage Vcom may be represented as a pixel voltage.

Figure 2:
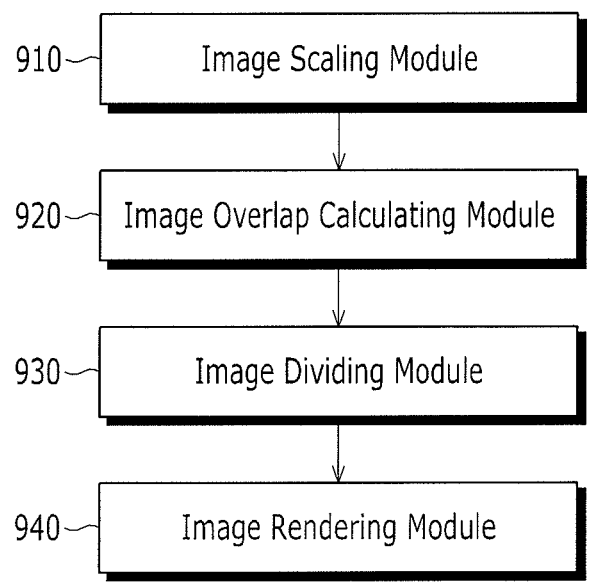
FIG. 2 is a system view of modules for generating a stereoscopic image according to an exemplary embodiment of the present disclosure.
Figure 3A:
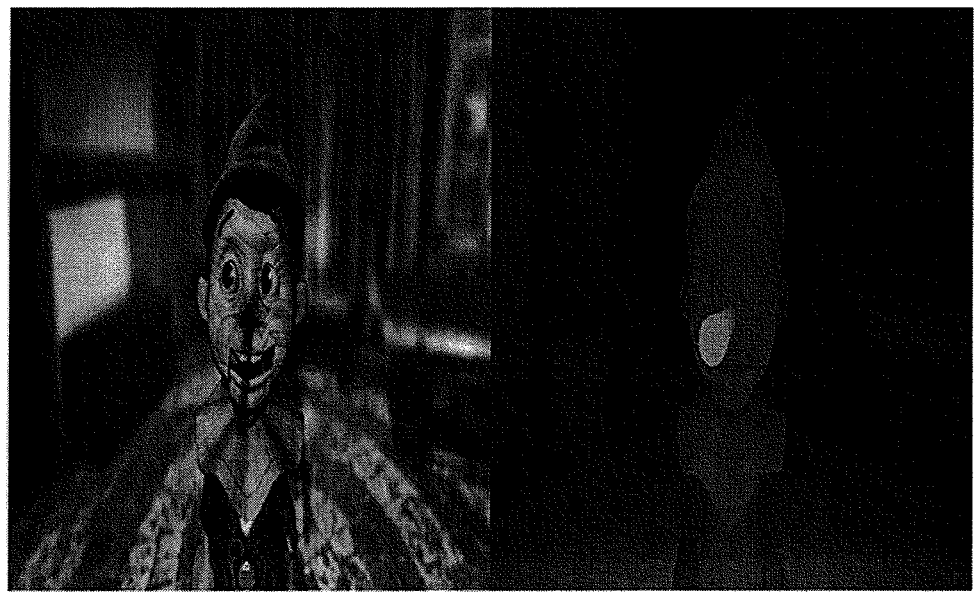
FIG. 3A to FIG. 3D are views showing images displayed in a stereoscopic image display device according to an exemplary embodiment of the present disclosure.
Figure 3B:
Figure 3C:
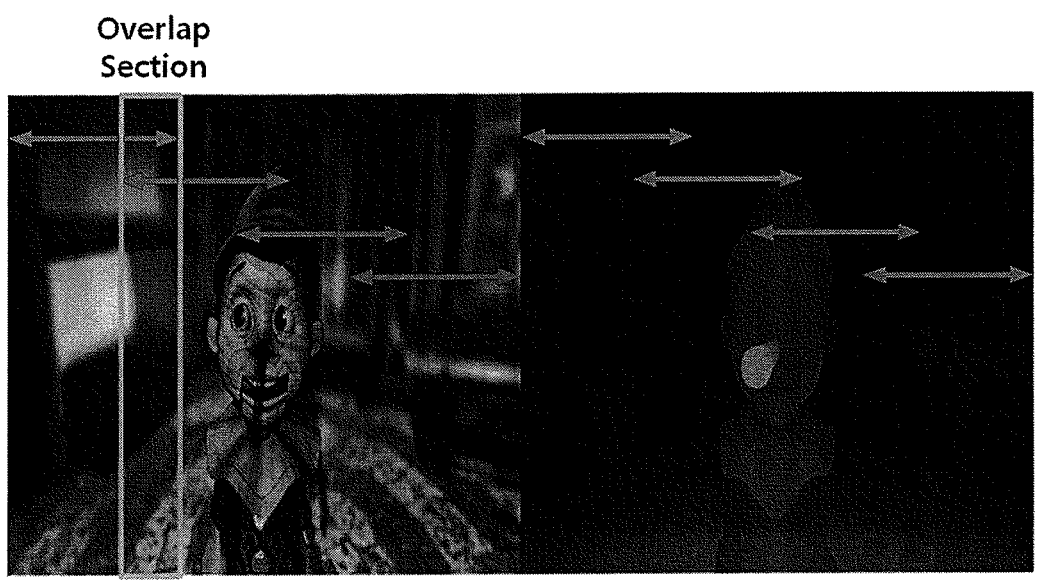
Figure 3D:
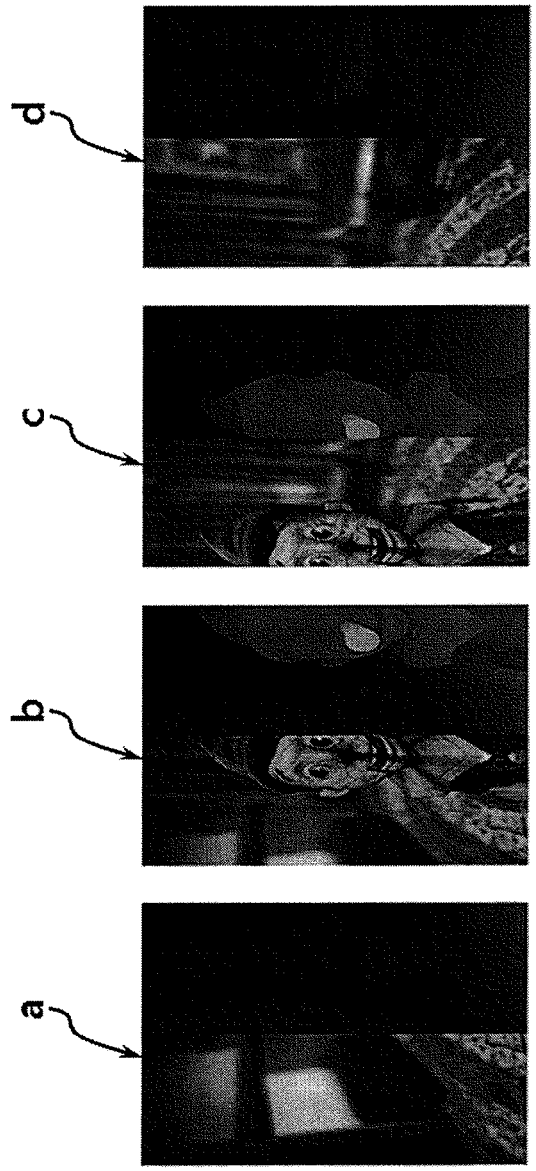
Figure 4A:
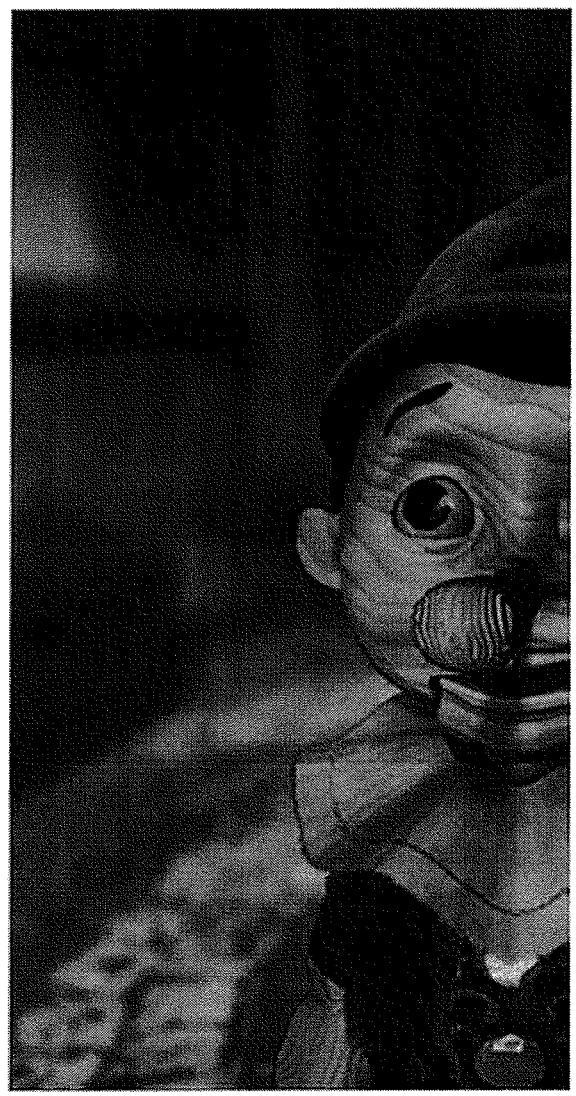
FIG. 4A and FIG. 4B are views showing images displayed in a stereoscopic image display device according to an exemplary embodiment of the present disclosure.
Figure 4B:
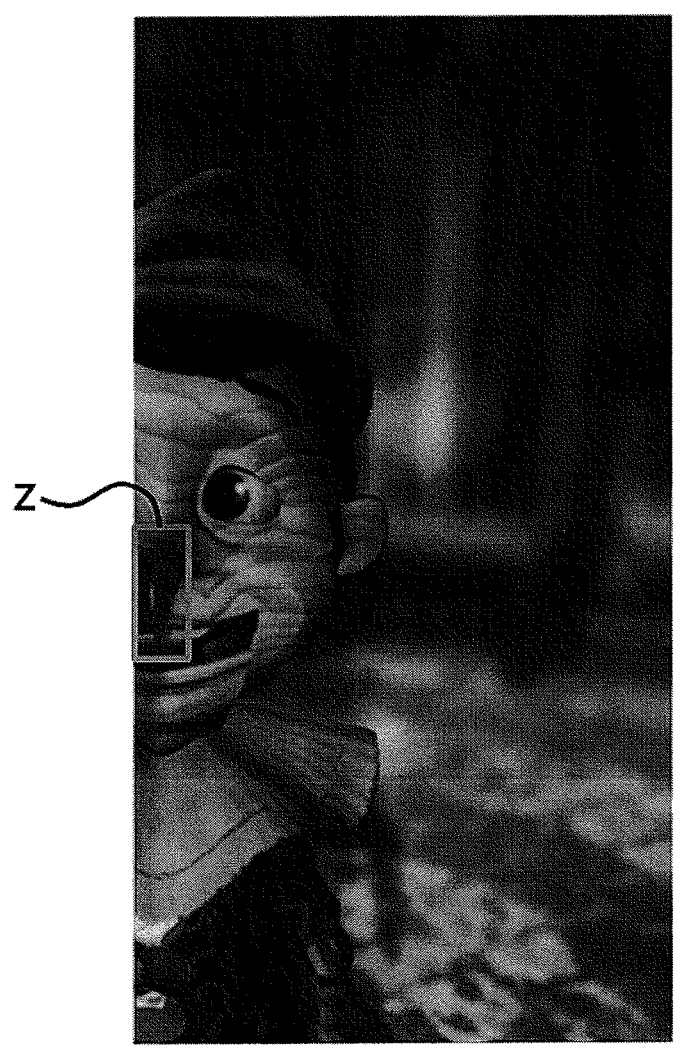
Figure 5:
FIG. 5 is a view showing images displayed in a stereoscopic image display device according to an exemplary embodiment of the present disclosure.

FIG. 2 is a system view of modules used to generate a stereoscopic image, FIG. 3A to FIG. 3D are views showing images displayed in a stereoscopic image display device according to an exemplary embodiment of the present disclosure, FIG. 4A and FIG. 4B are views showing images displayed in a stereoscopic image display device according to an exemplary embodiment of the present disclosure, and FIG. 5 is a view showing images displayed in a stereoscopic image display device according to an exemplary embodiment of the present disclosure.

Referring to FIG. 2, at least one of the modules 910-940 used for generating the stereoscopic image may be implemented in the form of an integrated chip. The modules 910-940 may be implemented as hardware, software, firmware, special purpose processors, or a combination thereof. According to an exemplary embodiment of the present disclosure, at least one of the modules 910-940 may be included in the signal controller 600. According to an exemplary embodiment of the present disclosure, the modules 910-940 may not be included in the signal controller 600.

FIG. 3A is an example of an input image, the image disposed at the left side in FIG. 3A is a 2D image, the image dispose at the right side in FIG. 3A is a depth information image, and the depth information image is the image representing the depth of the image disposed in the left side. For example, in a case of a high resolution image, the left side image and the right side image may each have a horizontal resolution of 1920 and a vertical resolution of 2160.

Referring to FIG. 2, the input image including the 2D image and the image representing the depth, is received by an image scaling module 910. The image scaling module 910 extends the input image in the horizontal direction. A scaling calculation may be executed by various methods such as an interpolation method. For example, the image the scaling module 910 receives the input image of FIG. 3A and extends the horizontal resolution of the input image by a predetermined number of pixels, thereby outputting the extended image of FIG. 3B. The 2D image and the depth information image of FIG. 3B may each have a horizontal resolution 2000 and a vertical resolution of 2160.

By using the extended image from the image scaling module 910, an image overlap calculating module 920 determines the length of an overlap section used for image division. The overlap refers portions of two images having substantially the same image data, and the right and left regions of divided images have substantially the same data. For example, in a case of using the extended image of FIG. 3B, as shown in FIG. 3C, the width of the overlap section is 80 pixels. In the 2D image and the depth information image, the width of the overlap sections may be substantially the same. In this example, the length of an arrow in FIG. 3C is indicative of the horizontal resolution of the divided image of an image dividing module 930, and for example, the length of the arrow of FIG. 3C is 560 pixels.

When the resolution of the input image is high, a capacity of an image transmission interface may be limiting. That is, the image transmission interface may have insufficient bandwidth for transmitting the input image. In such a case, the image data may be divided and portions of the image data may be transmitted independently. For example, the image dividing module 930 may divide the 2D image and the depth information image into a predetermined number of divisions. The divisions of the divided 2D image and the divided depth information image form respective pairs. For example, as shown in FIG. 3D, the extended 2D image and the extended depth information image may be divided into four pairs, and the four pairs may be independently transmitted by the signal lines. The predetermined number of divisions may be 4, 8, or 16 divisions, and it is not limited thereto. In FIG. 3D, the horizontal resolution of each of the divided 2D image and the divided depth information image is 560, and the vertical resolution is 2160.

Each pair of divisions, including a portion of the divided 2D image and a portion of the divided depth information image, from the image dividing module 930 is transmitted to an image rendering module 940. The image rendering module 940 renders the divided 2D image and the divided depth information image into a respective portion of a stereoscopic image. The divided 2D image and the divided depth information image form one pair such that the image rendering module 940 may use the same rendering for each pair of divisions, and thereby efficiency of the image rendering unit 940 may be improved. Also, the 2D image and the depth information image are divided in consideration of the image extension and a length of the overlap section such that a mismatch may not be generated in a boundary of the rendering. For example, the image b and the image c of FIG. 3D may be respectively rendered into the image of FIG. 4A and the image of FIG. 4B by the image rendering module 940.

After each of the divided images is rendered, the rendered images are combined into the stereoscopic image, and the display panel assembly 300 displays the stereoscopic image. For example, the image of FIG. 5 is a combination of the image of FIG. 4A, the image of FIG. 4B, a rendering of the image a of FIG. 3D, and a rendering of the image d of FIG. 3D.

The input image may include a header, and the header may include information such as information about a kind of image and information for the rendering. After the header is recognized in the input image, the recognized header is respectively input to the divided images to be used for the rendering performed by the image rendering module 940. The recognized header may be transmitted to the image rendering module 940 by a separate signal line to be used for the rendering of the image rendering unit 940.

A method for facilitating the stereoscopic perception of an image by a stereoscopic image display device at a plurality of views will be described with reference to FIG. 6.

Figure 6:
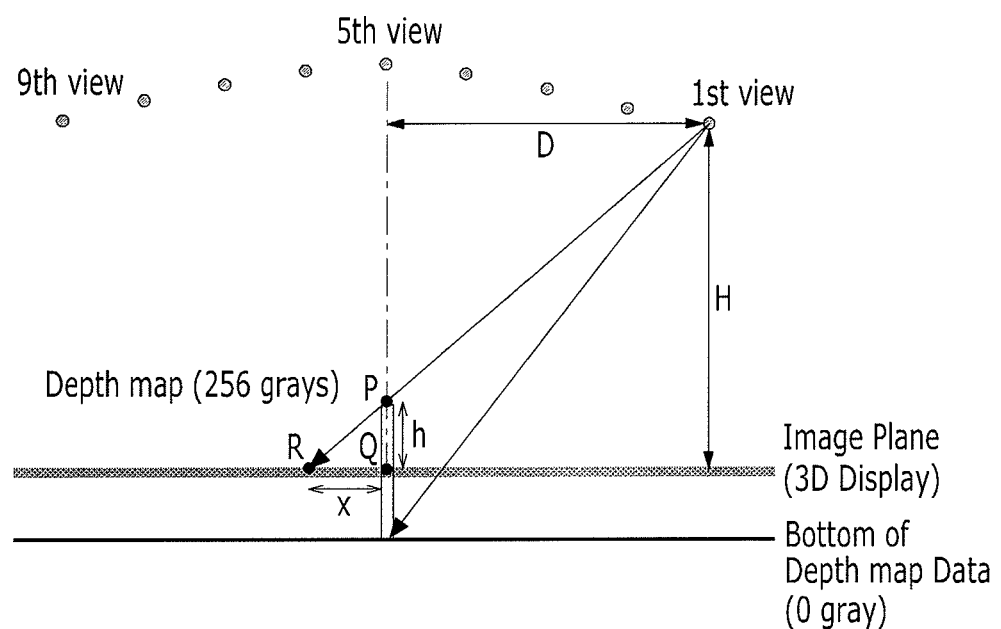
FIG. 6 is an illustration of a method of shifting an image according to depth information according to an exemplary embodiment of the present disclosure.

FIG. 6 is an illustration of a method for shifting an image according to depth information.

The display panel assembly 300 may include an optical device such as a lenticular lens or a parallax barrier disposed on the display panel. To facilitate the stereoscopic perception of the image at a plurality of views, the 2D image input may be shifted for each view according to the depth information of the input image. For example, the depth information may be represented by 256 grayscale values, the depth of the image display plane may be 126 grayscale values, the smallest depth may be 0, and the largest depth may be 255.

For example, referring to FIG. 6, there are nine views, and the nine images may be displayed to facilitate the stereoscopic perception at nine views. At the fifth view, an object at a position P is displayed at a position Q of the image plane. When the object at the position P of the first view is displayed at the position R of the image display plane, the stereoscopic perception of the object at the position P may be perceived such that the image shown in the first view may be shifted by a distance x with reference to the image shown in the fifth view. The shift distance for the view may be previously determined and may be stored in a memory, for example, as a look-up table.

The shift distance x according to the view may be determined based on the height of the object, a distance H between the corresponding view and the image display plane, and a distance D between a center view, e.g., the fifth view of FIG. 6, and the corresponding view. For example, x may be determined by Equation 1.

$$x=(h*D)/(H-h)$$ [Equation 1]

In Equation 1, x, h, D, and H may be measured in meters. The height h of the object may be controlled by a viewer, and for example, if the height h is high, the degree of the stereoscopic perception may be high, while if the height h is low, the degree of the stereoscopic perception may be low. The height h of an object may be given as a grayscale value. For example, the height h may be converted by into meters, such as in a case where the height h is equal to 1, which may correspond to 3 mm. The conversion of the height h may be variously defined. That is, the height h of 1 may be defined to correspond to different values. The shift distance x measured in units of pixels may be converted into meters. For example, the size of one pixel used in the stereoscopic image display device may be measured as in meters, and when the number of pixels is q (e.g., a horizontal resolution), if the shift distance x in pixels is divided by q, the shift distance x may be converted into meters.

Referring to FIG. 2 and FIG. 3C, the image overlap calculating module 920 may determine the length of the overlap section based on the shift distance x. For example, when the height h of the object is a maximum value, the shift distance x of the pixel unit may be determined, and the length of the overlap section may be greater than or equal to two times the determined shift distance x. When the height of the object is a maximum value in the image of FIG. 3C, the shift distance may be determined to be 40 pixels, and the width of the overlap section may be greater than or equal to 80 pixels. In Equation 1, when h is 40 cm, H is 400 cm, the fourth view D is 6.3 cm, the first view D is 25.2 cm, and the size of one pixel is 0.07 cm, the shift distance x is determined to be 40 pixels. The left and right side portions of the divided images are overlapped with each other such that a blank image portion generated during the rendering by the shift of the image may be removed. For example, in the rendering image of FIG. 4B, the blank image portion z may be removed in the combined image of FIG. 5.

According to an exemplary embodiment of the present disclosure, the display quality of a stereoscopic image of high resolution may be improved.

While exemplary embodiments of the present disclosure have been described herein, it is to be understood that the disclosure is not limited to exemplary embodiments, but, on the contrary, is intended to cover various modifications and equivalent arrangements included within the spirit and scope of the appended claims.

What is claimed is:

1. A stereoscopic image display device comprising:
an image dividing module dividing an input image of a frame in a vertical direction into a plurality of divisions that are arranged in a horizontal direction, the input image including a two dimensional (2D) image and a depth information image, each of the divisions includes a portion of the divided 2D image and a portion of the divided depth information image corresponding to the portion of the 2D image, a number of the divisions of the 2D image and a number of the divisions of the depth information image being the same;
an image rendering module receiving the plurality of divisions and rendering the divisions to output a plurality of rendered images; and
a display panel assembly combining the plurality of rendered images that are arranged in the horizontal direction into a stereoscopic image and displays the stereoscopic image.

2. The stereoscopic image display device of claim 1, wherein the plurality of divisions comprises a first division and a second division, and a right side region of the first division overlaps a left side of the second division, and image data of the right side region of the first division is substantially the same as image data of the left side region of the second division.

3. The stereoscopic image display device of claim 2, wherein a width of the left side region is substantially the same as a width of the right side region.

4. The stereoscopic image display device of claim 2, further comprising an image scaling module expanding the input image to output an extended image, wherein the image dividing module divides the extended image into the plurality of divisions.

5. The stereoscopic image display device of claim 4, wherein the extended image is extended in a horizontal direction as compared to the input image.

6. The stereoscopic image display device of claim 4, wherein the display panel assembly outputs a plurality of combined images corresponding to a plurality of views, the plurality of combined images including a first combined image corresponding to a first view and a second combined image corresponding to a second view, and wherein image data of the second combined image is shifted from a position of corresponding image data of the first combined image.

7. The stereoscopic image display device of claim 6, wherein a shift distance x of the second combined image is determined as x=(h*D)/(H−h) wherein h is a height of an object displayed by the display panel assembly, H is a distance between the second view and the display panel assembly, and D is a distance between the first view and the second view.

8. The stereoscopic image display device of claim 7, wherein a width of the left side region and a width of the right side region are equal to or greater than two times the shift distance x when h is a maximum value.

9. The stereoscopic image display device of claim 2, wherein the display panel assembly outputs a plurality of combined images corresponding to a plurality of views, the plurality of combined images including a first combined image corresponding to a first view and a second combined image corresponding to a second view, and wherein image data of the second combined image is shifted from a position of corresponding image data of the first combined image.

10. The stereoscopic image display device of claim 1, wherein the input image includes a header, and the header is respectively inserted to the divisions.

11. The stereoscopic image display device of claim 1, wherein the input image includes a header, and the header is transmitted to the image rendering module.

12. The stereoscopic image display device of claim 1, further comprising an image scaling module expanding the input image to output an extended image, wherein the image dividing module divides the extended image into the plurality of divisions.

13. The stereoscopic image display device of claim 12, wherein the display panel assembly outputs a plurality of combined images corresponding to a plurality of views, the plurality of combined images including a first combined image corresponding to a first view and a second combined image corresponding to a second view, and wherein image data of the second combined image is shifted from a position of corresponding image data of the first combined image.

14. The stereoscopic image display device of claim 1, wherein the display panel assembly outputs a plurality of combined images corresponding to a plurality of views, a plurality of combined images including a first combined image corresponding to a first view and a second combined image corresponding to a second view, and wherein image data of the second combined image is shifted from a position of corresponding image data of the first combined image.

15. A method of displaying a stereoscopic image, comprising:
- dividing an input image of a frame in a vertical direction into a plurality of divisions that are arranged in a horizontal direction, the input image including a two dimensional (2D) image and a depth information image;
- receiving and rendering the divisions to output respective rendered images; and
- combining the rendered images that are arranged in the horizontal direction into a stereoscopic image and displaying the stereoscopic image,
- wherein each of the divisions includes a portion of the divided 2D image and a portion of the divided depth information image corresponding to the portion of the 2D image, and
- a number of the divisions of the 2D image and a number of the divisions of the depth information image are the same.

16. The method of claim 15, wherein the plurality of divisions comprises a first division and a second division, and a right side region of the first division overlaps a left side of the second division, and image data of the right side region of the first division is substantially the same as image data of the left side region of the second division.

17. The method of claim 16, further comprising extending the input image to output an extended image, and the extended image is divided into the plurality of divisions.

18. The method of claim 17, wherein the outputting of the combined image further comprises outputting a plurality of combined images corresponding to a plurality of views, the plurality of combined images including a first combined image corresponding to a first view and a second combined image corresponding to a second view, and wherein image data of the second combined image is shifted from a position of corresponding image data of the first combined image.

19. The method of claim 18, wherein the combined image is output to the display panel assembly, and a shift distance x of the second combined image is determined as: $x=(h*D)/(H-h)$ wherein, h is a height of an object displayed by the display panel assembly, H is a distance between the second view and the display panel assembly, and D is a distance between the first view and the second view.

20. The method of claim 19, wherein a width of the left side region and a width of the right side region are equal to or greater than two times the shift distance x when h is a maximum value.

* * * * *